(12) United States Patent
Yoon et al.

(10) Patent No.: US 7,773,960 B2
(45) Date of Patent: Aug. 10, 2010

(54) APPARATUS AND METHOD FOR TRANSMITTING A SIGNAL IN A COMMUNICATION SYSTEM

(75) Inventors: Hyun-Su Yoon, Yongin-si (KR); Sei-Jei Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 789 days.

(21) Appl. No.: 11/647,950

(22) Filed: Dec. 29, 2006

(65) Prior Publication Data

US 2007/0178858 A1 Aug. 2, 2007

(30) Foreign Application Priority Data

Dec. 29, 2005 (KR) ................ 10-2005-0133780

(51) Int. Cl.
*H04B 1/04* (2006.01)
(52) U.S. Cl. .............. 455/127.1; 455/127.2; 455/127.4; 455/450
(58) Field of Classification Search .............. 455/127.1, 455/127.2, 127.4, 140, 144, 143, 168.1, 183.2, 455/188.1, 227, 232.1, 27.1, 247.1, 104, 455/108, 552.178, 114.3; 330/51, 151, 129, 330/252; 370/321, 337
See application file for complete search history.

(56) References Cited

U.S. PATENT DOCUMENTS

| | | | |
|---|---|---|---|
| 2002/0019235 A1 | 2/2002 | Kim et al. | |
| 2003/0153285 A1* | 8/2003 | Dekker | 455/104 |
| 2006/0084469 A1* | 4/2006 | Malone et al. | 455/552.1 |
| 2006/0087387 A1* | 4/2006 | Kubota et al. | 333/204 |
| 2006/0158250 A1* | 7/2006 | Ichitsubo et al. | 330/126 |
| 2006/0164163 A1* | 7/2006 | Apel et al. | 330/151 |
| 2007/0004350 A1* | 1/2007 | Yoon et al. | 455/127.1 |
| 2007/0004351 A1* | 1/2007 | Dekker | 455/127.1 |
| 2007/0018720 A1* | 1/2007 | Wright | 330/51 |
| 2007/0066245 A1* | 3/2007 | Snider | 455/78 |
| 2007/0080750 A1* | 4/2007 | Liebenrood | 330/252 |

FOREIGN PATENT DOCUMENTS

| | | |
|---|---|---|
| KR | 1020020012105 | 2/2002 |
| KR | 1020020078362 | 10/2002 |
| KR | 1020050061984 | 6/2005 |
| KR | 1020070001478 | 1/2007 |

* cited by examiner

*Primary Examiner*—Tan Trinh
(74) *Attorney, Agent, or Firm*—The Farrell Law Firm, LLP

(57) ABSTRACT

A method is provided for transmitting a signal in a signal transmission apparatus of a communication system. Upon receiving a signal, the signal transmission apparatus determines a mode of the received signal, in which a power amplifier should amplify the signal; generates a mode control signal corresponding to a single mode, if the mode of the received signal is determined as the single mode; amplifies and transmits the received signal in the single mode according to the mode control signal; generates a mode control signal corresponding to a multi-mode, if the mode of the received signal is the multi-mode; and amplifies and transmits the received signal in the multi-mode according to the mode control signal.

20 Claims, 12 Drawing Sheets

APPARATUS AND METHOD FOR TRANSMITTING A SIGNAL IN A COMMUNICATION SYSTEM

PRIORITY

This application claims priority under 35 U.S.C. §119(a) to an application filed in the Korean Intellectual Property Office on Dec. 29, 2005 and assigned Serial No. 2005-133780, the contents of which are incorporated herein by reference.

BACKGROUND OF THE INVENTION

1. Field of the Invention

The present invention relates generally to an apparatus and method for transmitting signals in a communication system, and in particular, to an apparatus and method for transmitting signals using a power amplifier in a communication system.

2. Description of the Related Art

Generally, a Radio Frequency (RF) power amplifier used in the current communication system is classified into a Single-Carrier Power Amplifier (SCPA) and a Multi-Carrier Power Amplifier (MCPA).

Referring to FIGS. 1A and 1B, a configuration of a general communication system using an SCPA will be described herein.

FIGS. 1A and 1B are diagrams schematically illustrating a structure of a signal transmission apparatus with SCPA in a general communication system. Specifically, FIG. 1A is a diagram schematically illustrating a structure of a signal transmission apparatus with an SCPA using a single Frequency Assignment (FA) in a general communication system, and FIG. 1B is a diagram schematically illustrating a structure of a signal transmission apparatus with SCPAs using multiple FAs in a general communication system.

Referring to FIG. 1A, the signal transmission apparatus includes a Single FA input signal Generation Block (SGB) 101, an SCPA 103, a Front End Block (FEB) 105, and an Antenna (ANT) 107.

Referring to FIG. 1B, the signal transmission apparatus includes a plurality of SGBs 111a to 111n, a plurality of SCPAs 113a to 113n, a Channel Combiner (CC) 115, an FEB 117, and an antenna 119.

As illustrated in FIGS. 1A and 1B, when the signal transmission apparatus transmits an RF power signal using an SCPA, it amplifies a single FA in the manner of FIG. 1A. When the signal transmission apparatus with SCPAs uses multiple FAs, it combines FAs amplified independently by the SCPAs using a channel combiner before transmission in the manner of FIG. 1B.

Specifically, shown in FIGS. 1A and 1B, the signal transmission apparatus with SCPA includes as many SCPAs as the number of FAs in use. Thus, when the number of FAs used in an initial system application is small, the signal transmission apparatus with SCPA can be advantageous over the signal transmission apparatus with MCPA in terms of cost competitiveness. The SCPA is optimized for amplifying a single FA. The general communication system, due to its limited number of antennas, should combine outputs of the SCPAs using a channel combiner for channel combination, if the number of FAs in operation increases. However, the channel combiner used at outputs of the SCPAs has a very high insertion loss, and can hardly combine adjacent FAs.

Therefore, when the signal transmission apparatus with SCPA transmits a multi-FA signal for which it should use a channel combiner, the SCPAs transmit the output which is higher than that of the MCPA by an insertion loss of the channel combiner, in order to allow the antenna to transmit the same output power. That is, an increase in the number of the FAs used in the signal transmission apparatus with SCPA causes an increase in the number of the SCPAs. In terms of the same antenna output, the SCPAs, compared with the MCPA, increase in system power consumption due to the insertion loss of the channel combiner, requiring a higher system cooling capability and thus increasing the system operating cost.

Next, with reference to FIGS. 2A and 2B, a structure of a signal transmission apparatus with MCPA in a general communication system will be described herein.

FIGS. 2A and 2B are diagrams schematically illustrating a structure of a signal transmission apparatus with MCPA in a general communication system. Specifically, FIG. 2A is a diagram illustrating a structure of a signal transmission apparatus with MCPA using a single FA in a general communication system, and FIG. 2B is a diagram illustrating a structure of a signal transmission apparatus with MCPA using multiple FAs in a general communication system.

Referring to FIG. 2A, the signal transmission apparatus includes an SGB 201, an MCPA 203, an FEB 205, and an antenna 207. Referring to FIG. 2B, the signal transmission apparatus includes a Multi-FA input signal Generation Block (MGB) 211, an MCPA 213, an FEB 215, and an antenna 217.

As illustrated in FIGS. 2A and 2B, in a communication system, a transmission signal input to an MCPA from a particular transceiver is a multi-FA combined signal, and the MCPA amplifies the input multi-FA signal.

Specifically, in the signal transmission apparatus with MCPA shown in FIGS. 2A and 2B, the MCPA, although it can amplify a single FA, is optimized for amplifying a combined multi-FA signal. In the communication system with limited number of antennas, as the MCPA does not use a channel combiner even though the number of FAs in operation increases, the MCPA, compared with the SCPAs, decreases in power consumption in terms of the same antenna output. Therefore, the MCPA requires a lower cooling capacity, thereby increasing competitiveness in the system implementation cost and the system operating cost.

Generally, however, the MCPA is higher than the SCPA in price per unit, and in a system with less number of FAs in operation, the MCPA uses only its partial capacity inefficiently, thereby increasing the initial system installation cost. In addition, when the system operates with less number of FAs so that it can use the SCPAs without channel combiner, the use of the MCPA is disadvantageous over the use of the SCPAs in terms of the efficiency.

As described above, FIGS. 1A and 1B and FIGS. 2A and 2B show preferred types and structures of RF power amplifiers used in the current communication system. In particular, FIGS. 1A and 1B show a structure of a signal transmission apparatus with SCPA, and FIGS. 2A and 2B show a structure of a signal transmission apparatus with MCPA.

The voice-oriented service of the existing communication system has overcome an inferiority of channels depending on channel coding. However, as a demand for the high-quality multimedia service in the communication system increases, there is a demand for a communication service capable of greatly increasing the communication capacity and improving the call quality by efficiently using the limited spectrum. As a scheme for realizing the demanded communication service, a Smart Antenna scheme and a Multiple Input Multiple Output (MIMO) scheme have been provided and are now under active study.

The communication technology using the Smart Antenna or MIMO scheme necessarily requires a structure that uses a plurality of transmission antennas, so it needs a plurality of RF power amplifiers. In addition, as the transmission bandwidth increases for high-speed data transmission, there is a need for an RF power amplifier for amplifying a broadband signal.

However, when a signal transmission apparatus with Smart Antenna or MIMO scheme is implemented with the existing SCPAs, the signal transmission apparatus uses a plurality of transmission antennas, thus it needs as many SCPAs as the product of the number of FAs and the number of antennas. Therefore, competitiveness of the system considerably decreases in terms of cost, structure and size. In addition, even when the signal transmission apparatus with Smart Antenna or MIMO scheme is implemented with MCPA, the signal transmission apparatus should use a plurality of transmission antennas, so it needs as many MCPAs as the number of antennas, decreasing competitiveness of the system in terms of the cost, structure and size.

In most communication systems, the RF power amplifiers occupy 30% or more of the system space, 50% or more of the system power consumption, and 35% or more of the system cost, so they are very important in terms of system competitiveness. Therefore, there is a need for a scheme of designing a system using a power amplifier capable of solving the problems of the existing system.

SUMMARY OF THE INVENTION

An object of the present invention is to address at least the problems and/or disadvantages and to provide at least the advantages described below. Accordingly, an aspect of the present invention is to provide a power amplification apparatus supporting multiple paths and multiple modes in a wireless communication system, and a data transmission method using the same.

Another object of the present invention is to provide a configuration of a wireless communication base station system using a multi-path/multi-mode power amplifier capable of decreasing complexity of a wireless communication system.

Further another object of the present invention is to provide a structure of a power amplifier supporting multiple paths and multiple modes capable of increasing efficiency of transmission paths and cost competitiveness according to an environment of a wireless communication system, and a signal transmission method using the same.

Yet another object of the present invention is to provide a transmission apparatus and method using a power amplifier supporting multiple paths and multiple modes, which can be applied to various operating schemes of a wireless communication system.

According to an aspect of the present invention, there is provided a method for transmitting a signal in a signal transmission apparatus of a communication system. The method includes upon receiving a signal, determining a mode of the received signal, in which a power amplifier should amplify the signal; generating a mode control signal corresponding to a single mode, if the mode of the received signal is determined as the single mode; amplifying and transmitting the received signal in the single mode according to the mode control signal; generating a mode control signal corresponding to a multi-mode, if the mode of the received signal is the multi-mode; and amplifying and transmitting the received signal in the multi-mode according to the mode control signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Figure 1A:
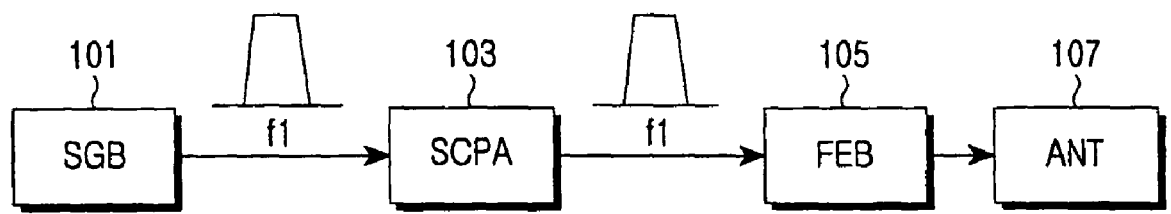
FIGS. 1A and 1B are diagrams schematically illustrating a structure of a transmission apparatus with an Single-Carrier Power Amplifier (SCPA)-based Radio Frequency (RF) power amplifier in a general communication system.
Figure 1B:
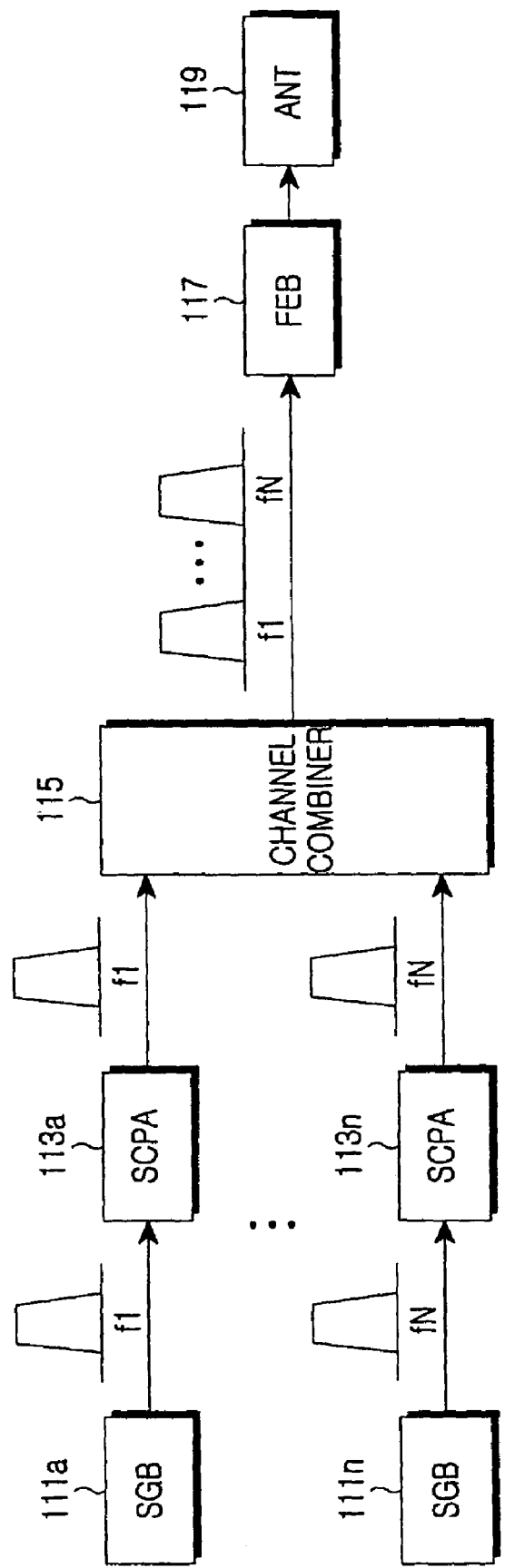
Figure 2A:
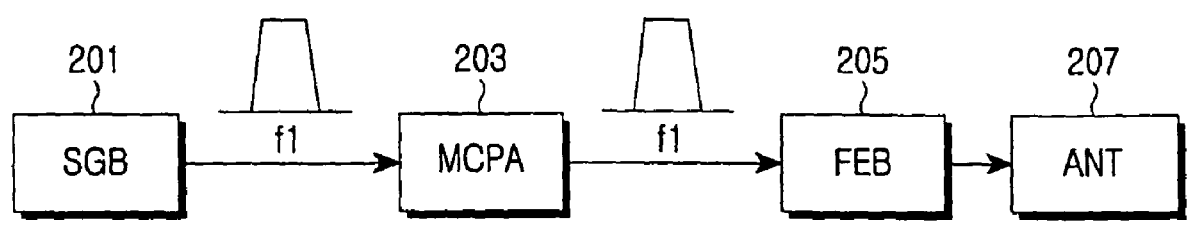
FIGS. 2A and 2B are diagrams schematically illustrating a structure of a transmission apparatus with an Multi-Carrier Power Amplifier (MCPA)-based RF power amplifier in a general communication system.
Figure 2B:
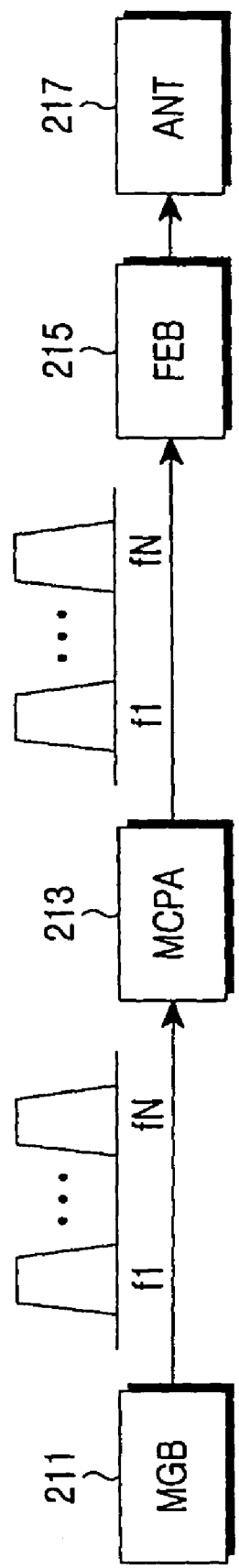

A preferred embodiment of the present invention will now be described in detail with reference to the annexed drawings. In the drawings, the same or similar elements, features and structures are denoted by the same reference numerals even though they are depicted in different drawings. In the following description, a detailed description of known functions and configurations incorporated herein has been omitted for clarity and conciseness.

The present invention provides a Radio Frequency (RF) power amplifier applied to a Base Station (BS) of a communication system, and a signal transmission apparatus using the same.

Specifically, the present invention provides to a Multi-path/Multi-mode RF Power Amplifier (MMPA) that has several RF amplification paths for one RF power amplifier and operates in two modes of a Single-Carrier Power Amplifier (SCPA) mode and a Multi-Carrier Power Amplifier (MCPA) mode, and provides a signal transmission apparatus and method for transmitting an RF transmission signal using the same.

Figure 3:
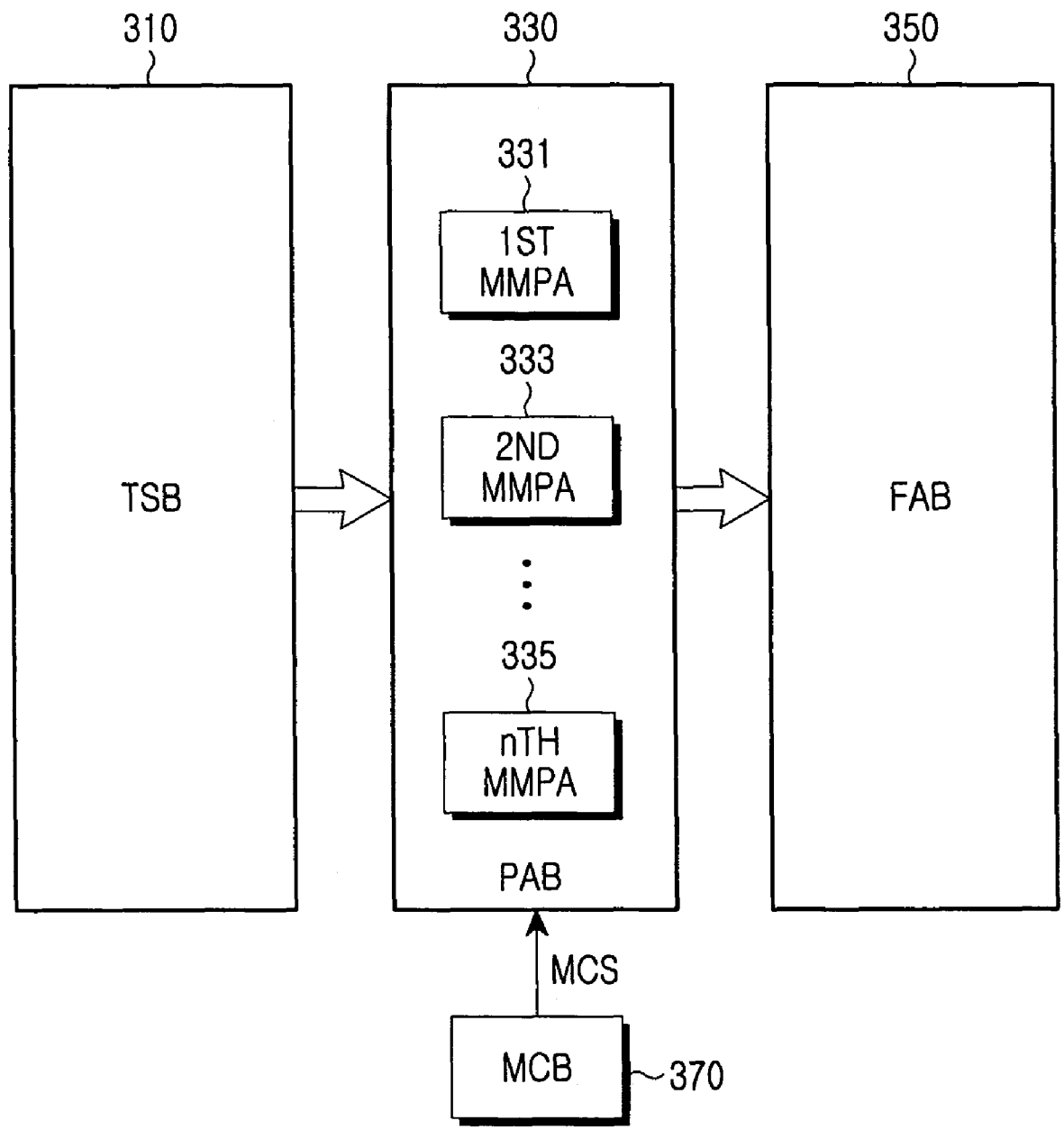
FIG. 3 is a diagram schematically illustrating a configuration of a base station system with Multi-path/Multi-mode RF Power Amplifier (MMPA) in a communication system according to the present invention.

As described above, the present invention provides an MMPA that operates in two modes, i.e. a single-FA mode and a multi-FA mode, and has several transmission signal amplification paths, and also provides a configuration of a communication base station system using the MMPA shown in FIG. 3.

That is, the present invention provides the MMPA by combining a function of a Single-path/Multi-mode RF Power Amplifier (SMPA) that operates in two modes, i.e. a single-FA mode with SCPA and a multi-FA mode with MCPA, with a function of a Multi-path RF Power Amplifier (MPA) that provides multiple transmission signal amplification paths by integrating several SMPAs into one RF power amplifier, thereby simplifying the complex system configuration using the same.

As such, the transmission structure of the existing system, when it operates a single FA, controls each SMPA of the MMPA to operate in the single-FA mode, thereby enjoying the merits of the SCPA in terms of the efficiency and cost competitiveness of the system with less number of FAs in operation. In addition, the transmission structure of the existing system, when it operates multiple FAs, controls each SMPA of the MMPA to operate in the multi-FA mode, thereby enjoying the merits of the MCPA in terms of the efficiency and cost competitiveness of the system. Further, the transmission structure of the system using multiple transmission antennas, like the Smart Antenna or Multiple Input Multiple Output (MIMO) scheme, forms a transmission path using the MMPA integrated from several SMPAs, thereby increasing system integration and thus increasing system competitiveness in terms of cost, efficiency and size.

That is, the system competitiveness can be maximized by optimizing the system configuration using one MMPA model according to various system operating schemes, such as the scheme of amplifying a signal of a narrow bandwidth like in the 1FA system, using the MMPA obtained by integrating several SMPAs into one RF power amplifier, the scheme of amplifying a signal of a broad bandwidth like in the multi-FA system, and the scheme where it is used for the structure requiring multiple transmission paths as in one of the Smart Antenna and MIMO system.

FIG. 3 is a diagram schematically illustrating a configuration of a base station system with MMPA in a communication system according to the present invention.

As illustrated in FIG. 3, a preferred configuration of the base station system according to the present invention includes a Transmission Signal generation Block (TSB) 310 for generating a transmission signal, a Power Amplifier Block (PAB) 330 for amplifying the signal provided from the TSB 310, a Front End and Antenna Block (FAB) 350 for outputting the signal amplified by the PAB 330, and a Mode Control Block (MCB) 370 for controlling modes of MMPAs(e.g., a first MMPA 331 to an nth MMPA 335), of the PAB 330 using a Mode Control Signal (MCS) according to system configuration.

Referring to FIG. 3, in the configuration of the wireless communication base station system with MMPA according to the present invention, the MCB 370 determines a single-FA mode and a multi-FA mode according to the number of Frequency Assignments (FAs) of a signal that an RF power amplifier should amplify, and transmits their associated Mode Control Signals (MCS) to corresponding MMPAs(e.g., a first MMPA 331 to an $n^{th}$ MMPA 335), in the PAB 330. Then, the MCB 370 controls each SMPA in the MMPAs 331 to 335 using the mode control signals.

Preferably, the TSB 310 includes as many signal generators as the product of the number of MMPAs included in the PAB 330 and the number of SMPAs included each of the MMPAs. The signal generators each transmit corresponding transmission signals to the SMPAs in each MMPA according to mode and antenna geometry, and the SMPAs receiving the transmission signals from the signal generators, from the MCB 370, mode control signals determined depending on the system configuration, and amplify the signals through an operation optimized for each mode.

An amplifier for amplifying a single-FA signal having a narrow bandwidth characteristic has various optimization schemes according to use/non-use of a linearizer and type of the linearizer, and in each case, there is an optimization scheme appropriate for amplification of the narrow-bandwidth signal in terms of the efficiency and a frequency component, i.e. spurious component, other than the frequency desired in the communication system. In addition, an amplifier for amplifying a multi-FA signal having a broad bandwidth characteristic has various optimization schemes according to the use/non-use of a linearizer and type of the linearizer, and in each case, there is an optimization scheme appropriate for amplification of the broad-bandwidth signal in terms of the efficiency and a spurious component.

The RF power amplifier differs in a characteristic optimization scheme for the case where it amplifies a narrow-bandwidth signal like the single-FA signal, and another case where it amplifies a broad-bandwidth signal like the multi-FA signal.

The present invention, as shown in FIG. 3, provides SMPAs, which can optimize one RF power amplifier for amplification of both the narrow-bandwidth signal and the broad-bandwidth signal according to FA mode of the communication system, and constructs the power amplifier by integrating several SMPAs into one MMPA. Using of such structures, the present invention can construct a communication base station system having various configurations, such as a 1~4FA/3Sector configuration as well as a multi-antenna configuration like one of the sectorized Smart Antenna and MIMO configuration, using one MMPA.

Figure 4:
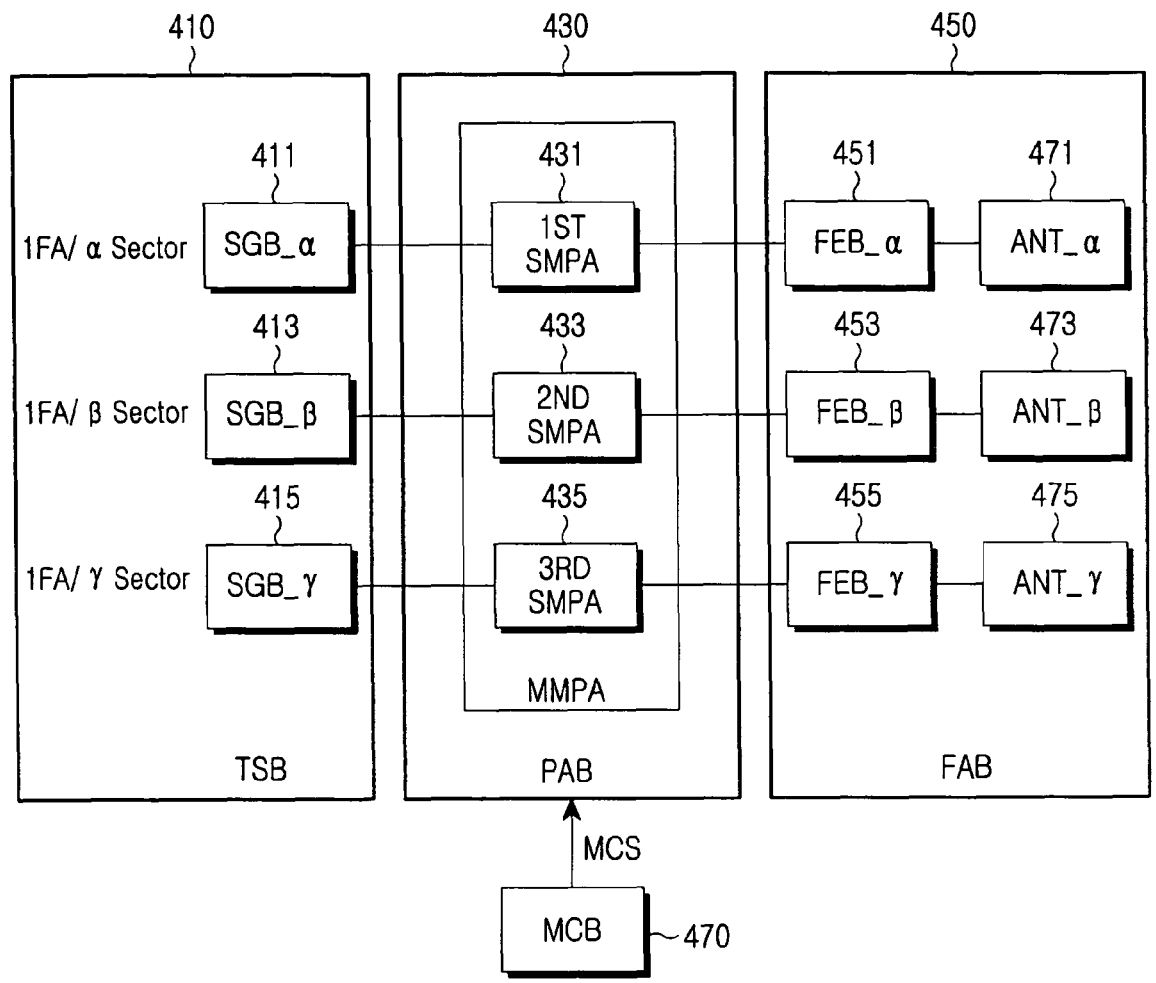
FIG. 4 is a diagram schematically illustrating a configuration of a 1 Frequency Assignment (1FA)/3Sector system with MMPA in a communication system according to the present invention.

FIG. 4 is a diagram schematically illustrating a configuration of a 1FA/3Sector system with MMPA in a communication system according to the present invention.

As illustrated in FIG. 4, in the 1FA/3Sector communication system, a preferable operation structure of the base station system according to the present invention includes a TSB 410 for generating a transmission signal, a PAB 430 for amplifying the signal provided from the TSB 410, an FAB 450 for outputting the signal amplified by the PAB 430, and an MCB 470 for controlling a mode of each MMPA in the PAB 430 according to the system configuration using a Mode Control Signal (MCS).

Preferably, as described above, the TSB 410 includes therein as many signal generators, for example, Single-FA input Signal Generation Blocks (SGBs), as the product of the total number of MMPAs and the number of SMPAs included in each MMPA. For example, in FIG. 4, because the total number of MMPAs is 1 and the number of SMPAs included in each MMPA is 3, the TSB 410 includes therein a total of 3 SGBs 411 to 415.

The PAB 430 may include more than one MMPA according to the system condition, and the MMPA can include a plurality of SMPAs(e.g., a first SMPA 431 to a third SMPA 435). The FAB 450 includes a plurality of FEBs (e.g., an FEB 451 to an FEB 455), and a plurality of antennas (e.g., an antenna 471 to an antenna 475), according to the front-end structure.

Referring to FIG. 4, a preferred transmission structure of the 1FA/3Sector system with MMPA, and an operation thereof will be described below.

In an operation of transmitting a single-FA transmission signal in the above system, the MCB 470 first delivers information indicating the single-FA mode to the MMPA using a mode control signal. Then, the MMPA receiving the single-FA mode control signal controls its SMPAs (e.g., the first SMPA 431 to the third SMPA 435), such that they operate in the single-FA mode. In the TSB 410, SGBs of respective sectors (e.g., an cc-sector SGB 411, a β-sector SGB 413, and a γ-sector SGB 415), generate single-FA input signals and transmit the generated single-FA input signals to the SMPAs 431 to 435 in the MMPA, respectively.

Then the SMPAs 431 to 435 in the MMPA, which are ready to operate in the single-FA mode through the mode control signal from the MCB 470, receive the single-FA signals generated by the SGBs 411 to 415, respectively. Thereafter, the SMPAs 431 to 435 each amplify the received single-FA signals in the single-FA mode according to the mode control signal, and output the amplified single-FA signals to the FAB 450. Then the FAB 450 transmits the amplified input signals via the FEBs 451 to 455 and the antennas 471 to 475.

As such, each SMPA in the MMPA, receiving the single-FA signal having the narrow-bandwidth characteristic, operates in the single-FA mode optimized for the narrow-bandwidth signal. Each FA signal amplified by the MMPA is transmitted via each FEB and antenna. In this system, one MMPA is used for transmitting 1FA/3Setor signals.

Figure 5:
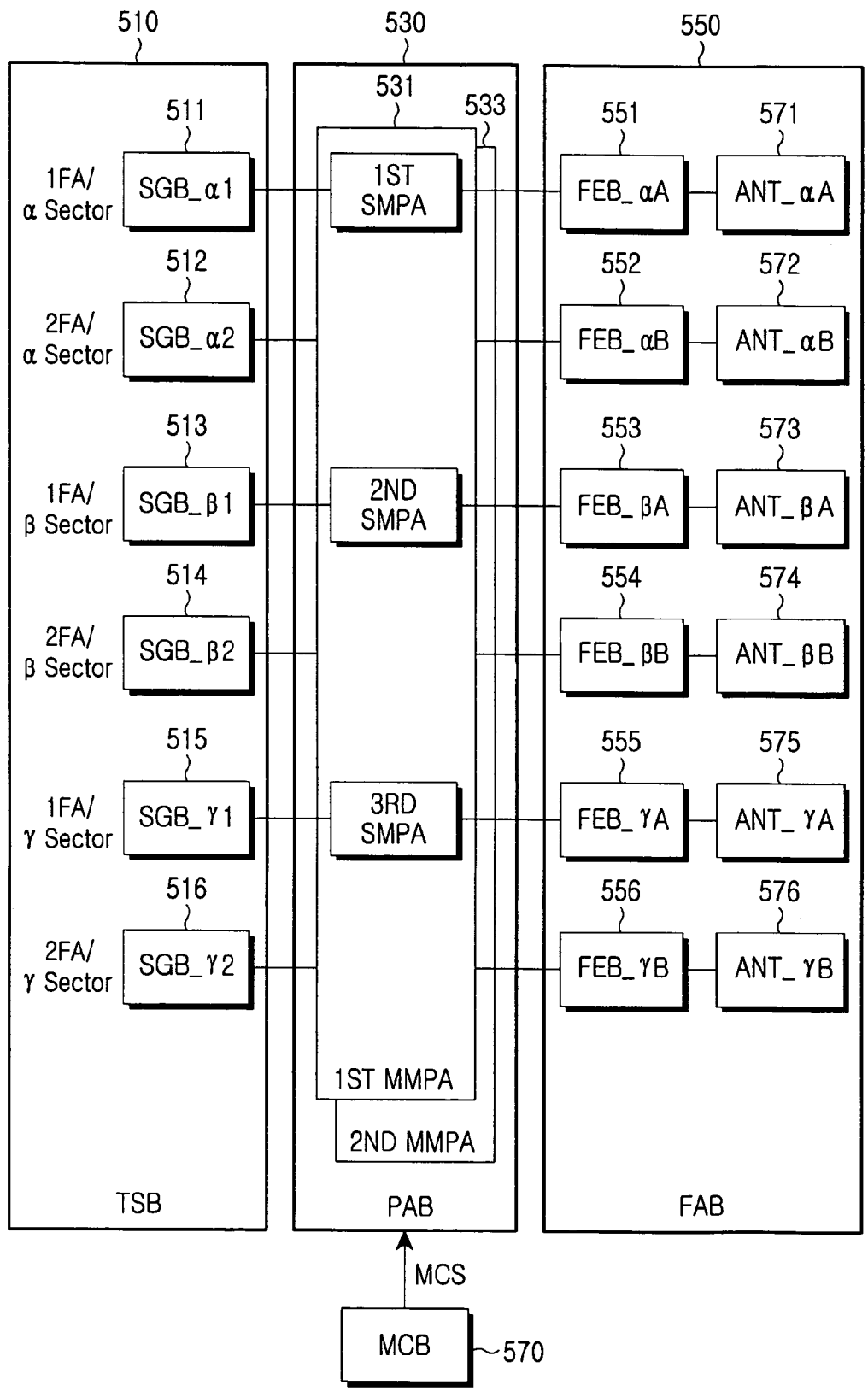
FIG. 5 is a diagram schematically illustrating a configuration of a 2FA/3Sector system with MMPA in a communication system according to the present invention.

FIG. 5 is a diagram schematically illustrating a configuration of a 2FA/3Sector system with MMPA in a communication system according to the present invention.

As illustrated in FIG. 5, in the 2FA/3Sector communication system, a preferable operation structure of the base station system according to the present invention includes a TSB 510 for generating a transmission signal, a PAB 530 for amplifying the signal provided from the TSB 510, an FAB 550 for outputting the signal amplified by the PAB 530, and an MCB 570 for controlling a mode of each MMPA in the PAB 530 according to the system configuration using a mode control signal.

Preferably, as described above, the TSB 510 includes therein as many signal generators, for example, SGBs, as the product of the total number of MMPAs and the number of SMPAs included in each MMPA. For example, in FIG. 5, because the total number of MMPAs 531 and 533 is 2 and the number of SMPAs included in each of the two MMPAs 531 and 533 is 3, the TSB 510 includes therein a total of 6 SGBs 511 to 516.

The PAB 530 may include more than one MMPA, for example, a first MMPA 531 and a second MMPA 533, according to the system condition, and each of the MMPAs 531 and 533 can include a plurality of SMPAs (E.G, a first SMPA to a third SMPA). The FAB 550 includes a plurality of FEBs(e.g., an FEB 551 to an FEB 556), and a plurality of antennas(e.g., an antenna 571 to an antenna 576), according to the front-end structure.

Referring to FIG. 5, a preferred transmission structure of the 2FA/3Sector system with MMPA, and an operation thereof will be described below.

In an operation of transmitting a 2FA transmission signal in the above system, the MCB 570 first delivers information indicating the single-FA mode to the two MMPAs 531 and 533 using a mode control signal. Then each of the MMPAs 531 and 533 receiving the single-FA mode control signal controls its SMPAs such that they operate in the single-FA mode. In the TSB 510, SGBs of respective sectors(e.g., α-sector SGBs 511 and 512, β-sector SGBs 513 and 514, and γ-sector SGBs 515 and 516), generate single-FA input signals and transmit the generated single-FA input signals to the SMPAs in each of the MMPAs 531 to 535.

Then the SMPAs in each of the MMPAs 531 to 535, which are ready to operate in the single-FA mode through the mode control signal from the MCB 570, receive the single-FA signals generated by the SGBs 511 to 516. Thereafter, the SMPAs each amplify the received single-FA signals in the single-FA mode according to the mode control signal, and output the amplified single-FA signals to the FAB 550. Then the FAB 550 transmits the amplified input signals via the FEBs 551 to 556 and the antennas 571 to 576.

As such, each SMPA in the two MMPAs, receiving the single-FA signal having the narrow-bandwidth characteristic, operates in the single-FA mode optimized for the narrow-bandwidth signal. Each FA signal amplified by each of the MMPAs is transmitted via each FEB and the antenna. In this system, two MMPAs are used for transmitting 2FA/3Setor signals.

Figure 6:
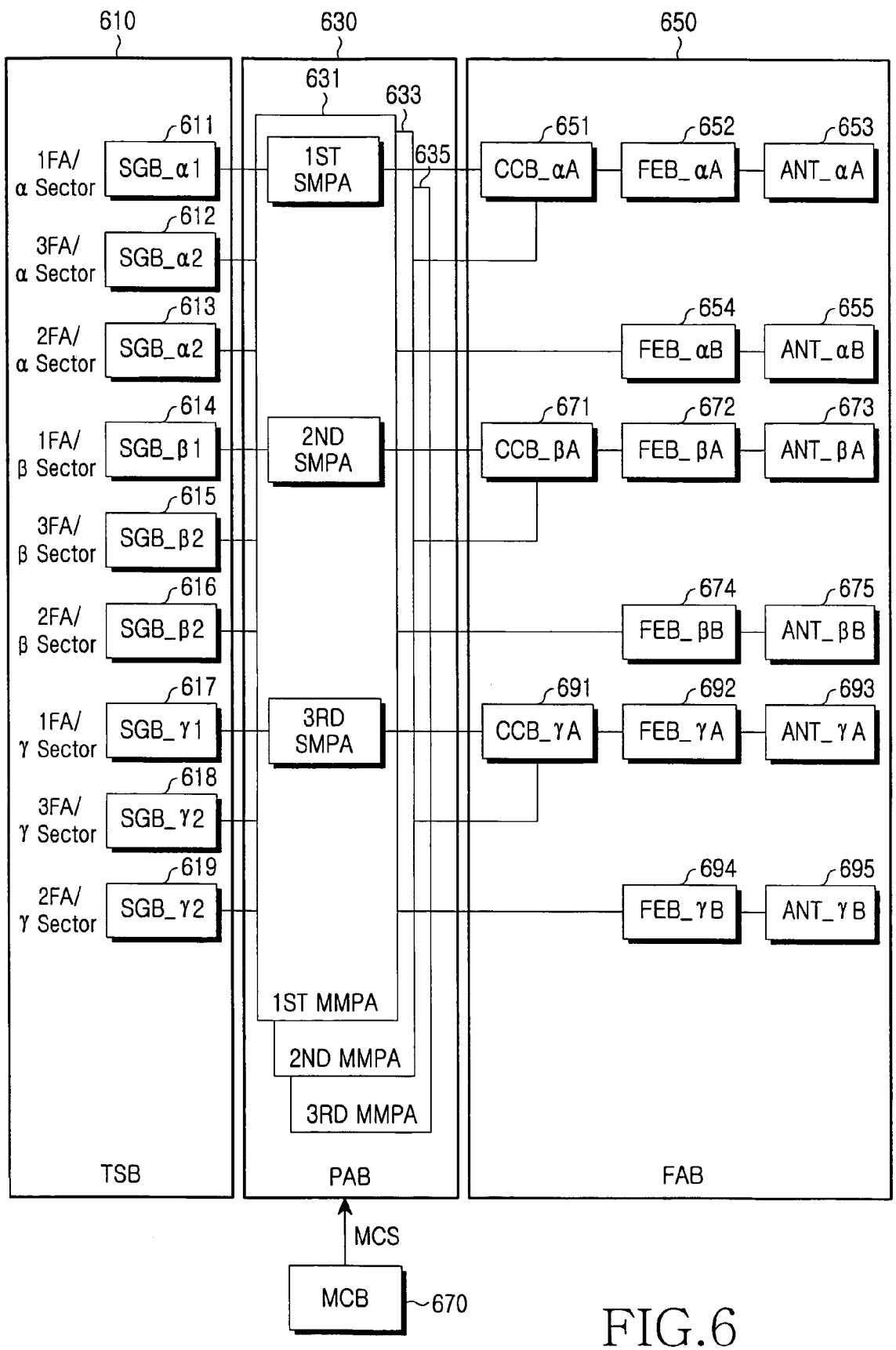
FIG. 6 is a diagram schematically illustrating a configuration of a 3FA/3Sector system with MMPA in a communication system according to the present invention.

FIG. 6 is a diagram schematically illustrating a configuration of a 3FA/3Sector system with MMPA in a communication system according to the present invention.

As illustrated in FIG. 6, in the 3FA/3Sector communication system, a preferable operation structure of the base station system according to the present invention includes a TSB 610 for generating a transmission signal, a PAB 630 for amplifying the signal provided from the TSB 610, an FAB 650 for outputting the signal amplified by the PAB 630, and an MCB 670 for controlling a mode of each MMPA in the PAB 630 according to the system configuration using a mode control signal.

Preferably, as described above, the TSB 610 includes therein as many signal generators (e.g., SGBs), as the product of the total number of MMPAs and the number of SMPAs included in each MMPA. For example, in FIG. 6, because the total number of MMPAs 631 to 635 is 3 and the number of SMPAs included in each of the three MMPAs 631 to 635 is 3, the TSB 610 includes therein a total of 9 SGBs 611 to 619.

The PAB 630 may include more than one MMPA (e.g., a first MMPA 631, a second MMPA 633 and a third MMPA 635), according to the system condition, and each of the MMPAs 631 to 635 can include a plurality of SMPAs(e.g., a first SMPA to a third SMPA). The FAB 650 includes more than one Channel Combining Block (CCB)(e.g., a CCB 651, a CCB 671 and a CCB 691), a plurality of FEBs(e.g., an FEB 652, an FEB 654, an FEB 672, an FEB 674, an FEB 692 and an FEB 694), and a plurality of antennas(e.g., an antenna 653, an antenna 655, an antenna 673, an antenna 675, an antenna 693 and an antenna 695), according to the front-end structure.

Referring to FIG. 6, a preferred transmission structure of the 3FA/3Sector system with MMPA, and an operation thereof will be described below.

In an operation of transmitting a 3FA transmission signal in the above system, the MCB 670 first delivers information indicating the single-FA mode to the three MMPAs 631, 633 and 635 using a mode control signal. Then each of the MMPAs 631, 633 and 635 receiving the single-FA mode control signal controls its SMPAs such that they operate in the single-FA mode. In the TSB 610, SGBs of respective sectors (e.g., α-sector SGBs 611, 612 and 613, β-sector SGBs 614, 615 and 616, and γ-sector SGBs 617, 618 and 619), generate single-FA input signals and transmit the generated single-FA input signals to the SMPAs in each of the MMPAs 631, 633 and 635.

Then the SMPAs in each of the MMPAs 631, 633 and 635, which are ready to operate in the single-FA mode through the mode control signal from the MCB 670, receive the single-FA signals generated by the SGBs 611 to 619. Thereafter, the SMPAs each amplify the received single-FA signals in the single-FA mode according to the mode control signal, and output the amplified single-FA signals to the FAB 650. Then the FAB 650 transmits the amplified input signals via the FEBs 652, 654, 672, 674, 692 and 694, and the antennas 653, 655, 673, 675, 693 and 695.

As such, each SMPA in the three MMPAs, receiving the single-FA signal having the narrow-bandwidth characteristic, operates in the single-FA mode optimized for the narrow-bandwidth signal. Here, the number of FEBs and antennas of the sector system is generally limited to 2 per sector. Therefore, as shown in FIG. 6, the 1FA signals and the 3FA signals are combined by the channel combiners (e.g., the CCBs 651, 671 and 691), and then delivered to the FEBs, and the 2FA signals are directly delivered to the FEBs. Here, the channel combiners are used for combining signals having different frequencies. The 1FA signals should not be adjacent to the 3FA signals according to characteristics of the channel combiners. Each FA signal amplified by each of the MMPAs is transmitted via each FEB and antenna. In this system, three MMPAs are used for transmitting 3FA/3Setor signals.

Figure 7:
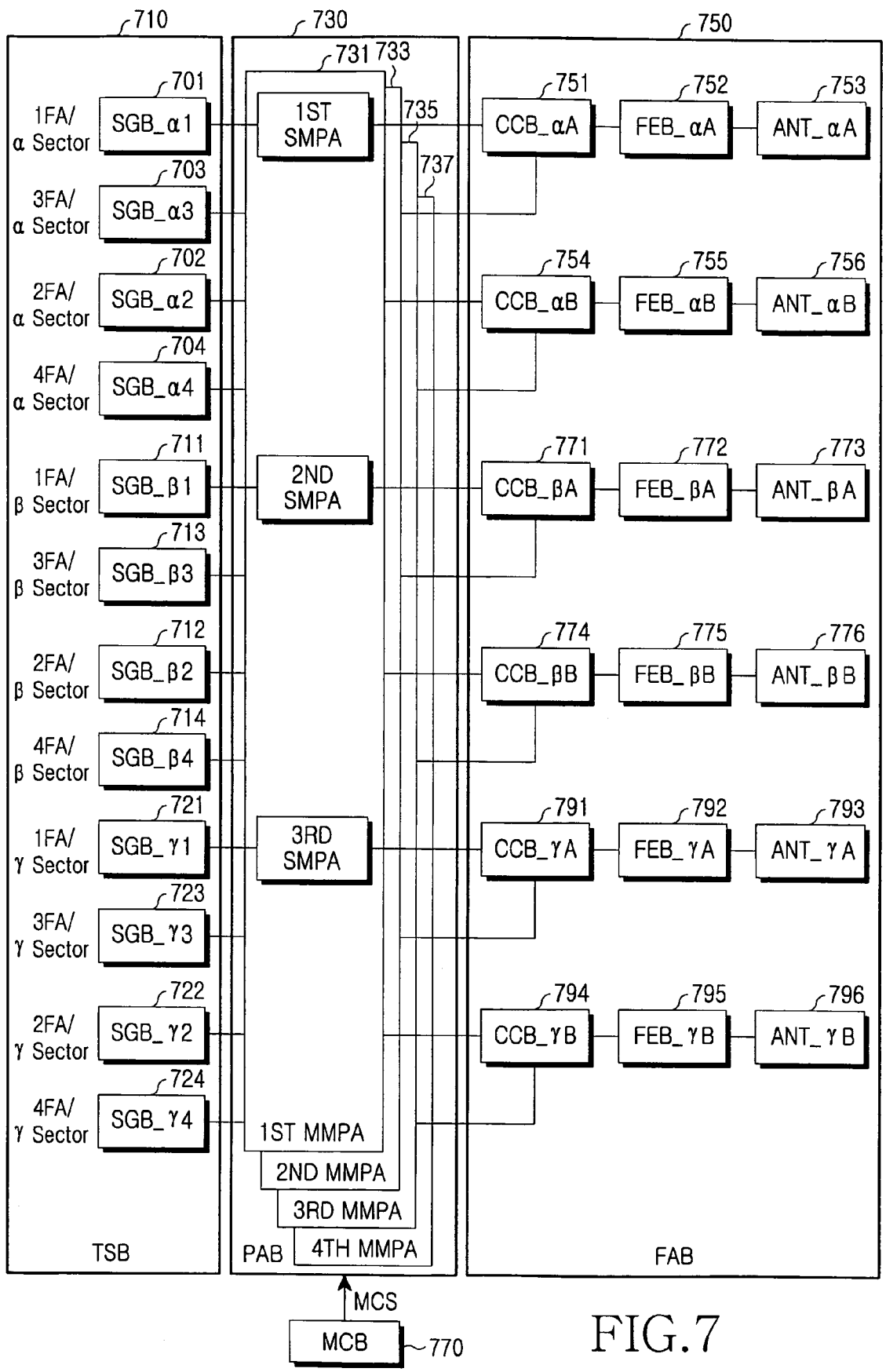
FIG. 7 is a diagram schematically illustrating a configuration of a 4FA/3Sector system with MMPA in a communication system according to the present invention.

FIG. 7 is a diagram schematically illustrating a configuration of a 4FA/3Sector system with MMPA in a communication system according to the present invention.

As illustrated in FIG. 7, in the 4FA/3Sector communication system, a preferable operation structure of the base station system according to the present invention includes a TSB 710 for generating a transmission signal, a PAB 730 for amplifying the signal provided from the TSB 710, an FAB 750 for outputting the signal amplified by the PAB 730, and an MCB 770 for controlling a mode of each MMPA in the PAB 730 according to the system configuration using a mode control signal.

Preferably, as described above, the TSB 710 includes therein as many signal generators(e.g., SGBs), as the product of the total number of MMPAs and the number of SMPAs included in each MMPA. For example, in FIG. 7, because the total number of MMPAs 731 to 737 is 4 and the number of SMPAs included in each of the four MMPAs 731 to 737 is 3, the TSB 710 includes therein a total of 12 SGBs 701 to 704, 711 to 714, and 721 to 724.

The PAB 730 may include more than one MMPA (e.g., a first MMPA 731, a second MMPA 733, a third MMPA 735 and a fourth MMPA 737), according to the system condition, and each of the MMPAs 731 to 737 can include a plurality of SMPAs(e.g., a first SMPA to a third SMPA). The FAB 750 includes more than one CCB(e.g., a CCB 751, a CCB 754, a CCB 771, a CCB 774, a CCB 791 and a CCB 794), a plurality of FEBs(e.g., an FEB 752, an FEB 755, an FEB 772, an FEB 775, an FEB 792 and an FEB 795), and a plurality of antennas (e.g., an antenna 753, an antenna 756, an antenna 773, an antenna 776, an antenna 793 and an antenna 796), according to the front-end structure.

Referring to FIG. 7, a preferred transmission structure of the 4FA/3Sector system with MMPA, and an operation thereof will be described below.

In an operation of transmitting a 4FA transmission signal in the above system, the MCB 770 first delivers information indicating the single-FA mode to the four MMPAs 731, 733, 735 and 737 using a mode control signal. Then each of the MMPAs 731, 733, 735 and 737 receiving the single-FA mode control signal controls its SMPAs such that they operate in the single-FA mode. In the TSB 710, SGBs of respective sectors (e.g., α-sector SGBs 701, 702, 703 and 704, β-sector SGBs 711, 712, 713 and 714, and γ-sector SGBs 721, 722, 723 and 724), generate single-FA input signals and transmit the generated single-FA input signals to the SMPAs in each of the MMPAs 731, 733, 735, 737.

Then the SMPAs in each of the MMPAs 731, 733, 735 and 737, which are ready to operate in the single-FA mode through the mode control signal from the MCB 770, receive the single-FA signals generated by the SGBs 701 to 704, 711 to 714, and 721 to 724. Thereafter, the SMPAs each amplify the received single-FA signals in the single-FA mode according to the mode control signal, and output the amplified single-FA signals to the FAB 750. Then the FAB 750 transmits the amplified input signals via the FEBs 752, 755, 772, 775, 792 and 795, and the antennas 753, 756, 773, 776, 793 and 796.

As such, each SMPA in the four MMPAs, receiving the single-FA signal having the narrow-bandwidth characteristic, operates in the single-FA mode optimized for the narrow-bandwidth signal. Here, the number of FEBs and antennas of the sector system is generally limited to 2 per sector. Therefore, as shown in FIG. 7, the 1FA signals and the 3FA signals are combined, and the 2FA signals and the 4FA signals are combined by the channel combiners (e.g., the CCBs 751, 754, 771, 774, 791 and 794), and then delivered to the FEBs. Here, the channel combiners are used for combining signals having different frequencies. The 1FA signals should not be adjacent to the 3FA signals, and the 2FA signals should not be adjacent to the 4FA signals according to characteristics of the channel combiners. Each FA signal amplified by each of the MMPAs is transmitted via each FEB and antenna. In this system, four MMPAs are used for transmitting 4FA/3Setor signals.

Figure 8:
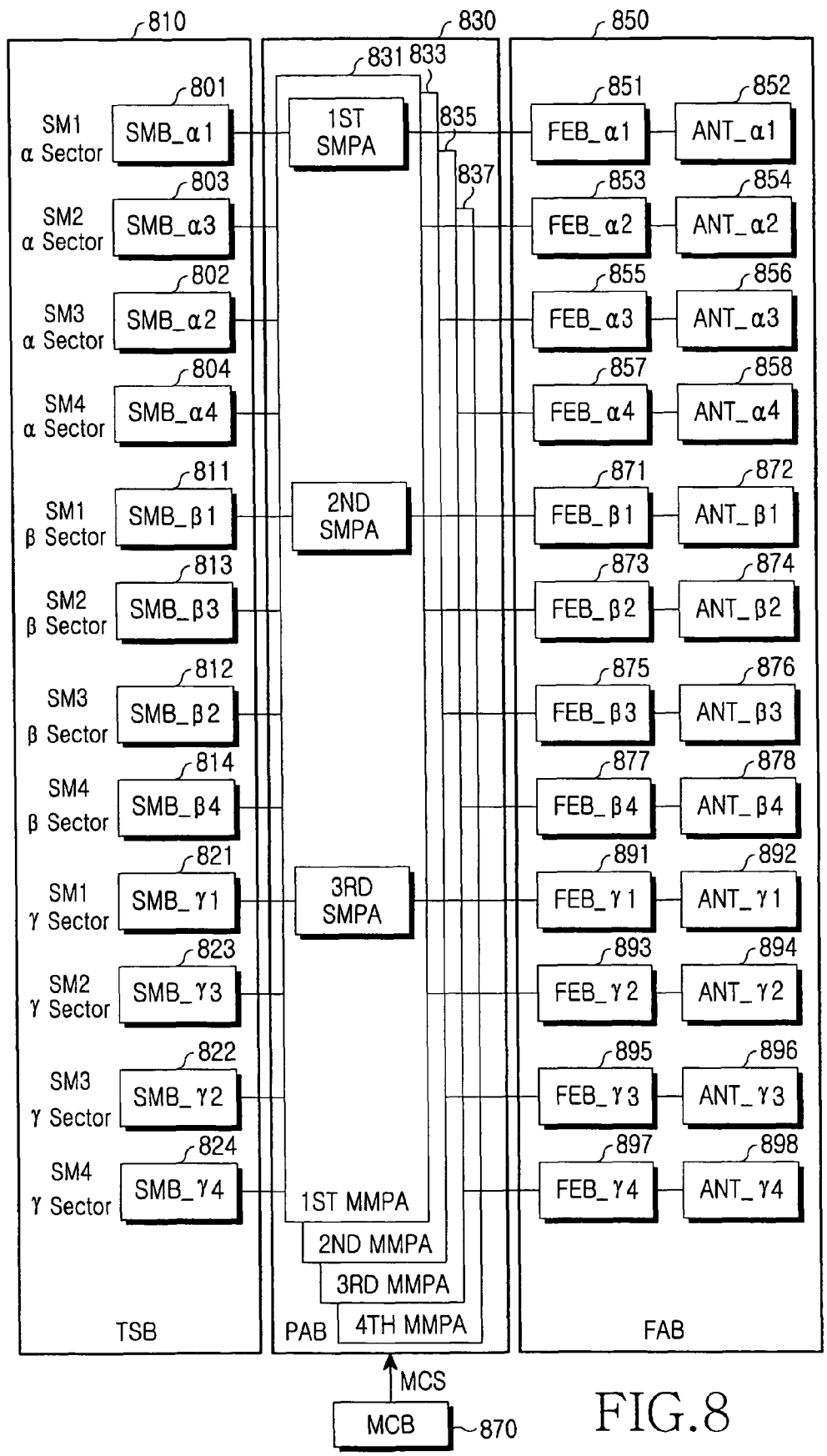
FIG. 8 is a diagram schematically illustrating a configuration of a 1FA/Multi-Antenna system with MMPA in a communication system according to the present invention.

FIG. 8 is a diagram schematically illustrating a configuration of a 1FA/Multi-Antenna system with MMPA in a communication system according to the present invention.

As illustrated in FIG. 8, in the 1FA/Multi-Antenna communication system, a preferable operation structure of the base station system according to the present invention includes a TSB 810 for generating a transmission signal, a PAB 830 for amplifying the signal provided from the TSB 810, an FAB 850 for outputting the signal amplified by the PAB 830, and an MCB 870 for controlling a mode of each MMPA in the PAB 830 according to the system configuration using a mode control signal.

Preferably, as described above, the TSB 810 includes therein as many signal generators, for example, Single-FA input signal for Multiple antenna generation Blocks (SMBs), as the product of the total number of MMPAs and the number of SMPAs included in each MMPA. For example, in FIG. 8, because the total number of MMPAs 831 to 837 is 4 and the number of SMPAs included in each of the four MMPAs 831 to 837 is 3, the TSB 810 includes therein a total of 12 SMBs 801 to 804,811 to 814, and 821 to 824.

The PAB 830 may include more than one MMPA (e.g., a first MMPA 831, a second MMPA 833, a third MMPA 835 and a fourth MMPA 837), according to the system condition, and each of the MMPAs 831 to 837 can include a plurality of SMPAs(e.g., a first SMPA to a third SMPA). The FAB 850 includes a plurality of FEBs(e.g., FEBs 851 to 857, FEBs 871 to 877 and FEBs 891 to 897), and a plurality of antennas(e.g., antennas 822 to 828, antennas 872 to 878 and antennas 892 to 898), according to the front-end structure.

Referring to FIG. 8, a preferred transmission structure of the 1FA/Multi-Antenna system with MMPA having a configuration supporting four antennas, and an operation thereof will be described below.

In an operation of transmitting transmission signals in the 1FA/Multi-Antenna system, SMBs 801 to 804, 811 to 814, and 821 to 824 in the TSB 810 first transmit Single-FA signal for Multiple antenna (SM) signals to the MMPAs 831, 833, 835 and 837.

When the SMBs 801 to 804, 811 to 814, and 821 to 824 in the TSB 810 transmit the Single-FA signal for Multiple antenna (SM) signals, the MCB 870 delivers information indicating the single-FA mode to the four MMPAs 831, 833, 835 and 837 using a mode control signal. Then each of the MMPAs 831, 833, 835 and 837 receiving the single-FA mode control signal controls its SMPAs such that they operate in the single-FA mode.

In the TSB 810, SMBs of respective sectors (e.g., α-sector SMBs 801, 802, 803 and 804, β-sector SMBs 811, 812, 813 and 814, and γ-sector SMBs 821, 822, 823 and 824), generate Single-FA signal for Multiple antenna (SM) signals and transmit the generated Single-FA signal for Multiple antenna (SM) signals to the SMPAs in each of the MMPAs 831, 833, 835, 837.

Then the SMPAs in each of the MMPAs 831, 833, 835 and 837, which are ready to operate in the single-FA mode through the mode control signal from the MCB 870, receive the single-FA signals generated by the SMBs 801 to 804, 811 to 814, and 821 to 824. That is, first SMPAs in the MMPAs 831, 833, 835 and 837 receive α-sector Single-FA signal for Multiple antenna (SM) signals from the α-sector SMBs 801, 802, 803 and 804, second SMPAs in the MMPAs 831, 833, 835 and 837 receive β-sector Single-FA signal for Multiple antenna (SM) signals from the β-sector SMBs 811, 812, 813 and 814, and third SMPAs in the MMPAs 831, 833, 835 and 837 receive γ-sector Single-FA signal for Multiple antenna (SM) signals from the γ-sector SMBs 821, 822, 823 and 824.

Thereafter, the SMPAs each amplify the received Single-FA signal for Multiple antenna (SM) signals in the single-FA mode according to the mode control signal, and output the amplified Single-FA signal for Multiple antenna (SM) signals to the FAB 850.

That is, the first SMPAs each amplify α-sector Single-FA signal for Multiple antenna (SM) signals received from the SMBs 801, 802, 803 and 804 in the single-FA mode according to the mode control signal, and then transmit the amplified signals to the FEBs 851, 853, 855 and 857. The second SMPAs each amplify β-sector Single-FA signal for Multiple antenna (SM) signals received from the SMBs 811, 812, 813 and 814 in the single-FA mode according to the mode control signal, and then transmit the amplified signals to the FEBs 871, 873, 875 and 877. The third SMPAs each amplify γ-sector Single-FA signal for Multiple antenna (SM) signals received from the SMBs 821, 822, 823 and 824 in the single-FA mode according to the mode control signal, and then transmit the amplified signals to the FEBs 891, 893, 895 and 897.

Then the FAB 850 transmits the amplified input signals via the FEBs 851 to 857, 871 to 877, and 891 to 897, and the antennas 852 to 858, 872 to 878, and 892 to 898.

As such, each SMPA in the four MMPAs, receiving the Single-FA signal for Multiple antenna (SM) signals having the narrow-bandwidth characteristic, operates in the single-FA mode optimized for the narrow-bandwidth signal. Each Single-FA signal for Multiple antenna (SM) signal amplified by each of the MMPAs is transmitted via each FEB and antenna. The system shown in FIG. 8 has a preferred configuration supporting four antennas, and the number of the MMPAs is adaptively changeable according to the number of antennas.

Figure 9:
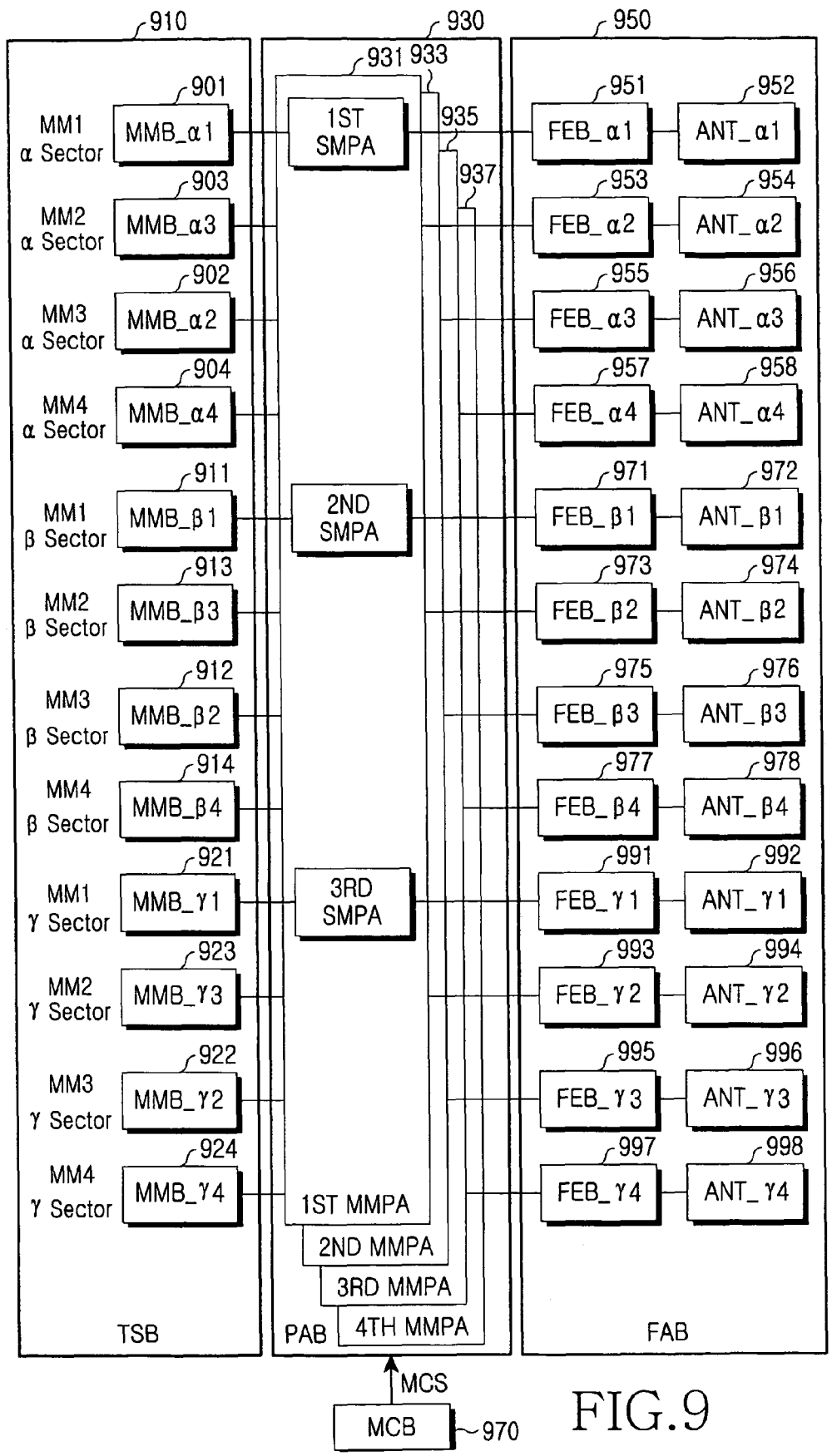
FIG. 9 is a diagram schematically illustrating a configuration of a Multi-FA/Multi-Antenna system with MMPA in a communication system according to the present invention.

FIG. 9 is a diagram schematically illustrating a configuration of a Multi-FA/Multi-Antenna system with MMPA in a communication system according to preferred embodiment of the present invention.

As illustrated in FIG. 9, in the Multi-FA/Multi-Antenna communication system, a preferable operation structure of the base station system according to the present invention includes a TSB 910 for generating a transmission signal, a PAB 930 for amplifying the signal provided from the TSB 910, an FAB 950 for outputting the signal amplified by the PAB 930, and an MCB 970 for controlling a mode of each MMPA in the PAB 930 according to the system configuration using a mode control signal.

Preferably, as described above, the TSB 910 includes therein as many signal generators, for example, Multi-FA input signal for Multiple antenna generation Blocks (MMBs), as the product of the total number of MMPAs and the number of SMPAs included in each MMPA. For example, in FIG. 9, because the total number of MMPAs 931 to 937 is 4 and the number of SMPAs included in each of the four MMPAs 931 to 937 is 3, the TSB 910 includes therein a total of 12 MMBs 901 to 904, 911 to 914, and 921 to 924.

The PAB 930 may include more than one MMPA(e.g., a first MMPA 931, a second MMPA 933, a third MMPA 935 and a fourth MMPA 937), according to the system condition, and each of the MMPAs 931 to 937 can include a plurality of SMPAs(e.g., a first SMPA to a third SMPA). The FAB 950 includes a plurality of FEBs(e.g., FEBs 951 to 957, FEBs 971 to 977 and FEBs 991 to 997), and a plurality of antennas(e.g., antennas 922 to 928, antennas 972 to 978 and antennas 992 to 998), according to the front-end structure.

Referring to FIG. 9, a preferred transmission structure of the Multi-FA/Multi-Antenna system with MMPA having a configuration supporting four antennas, and an operation thereof will be described below.

In an operation of transmitting transmission signals in the Multi-FA/Multi-Antenna system, MMBs 901 to 904, 911 to 914, and 921 to 924 in the TSB 910 first transmit Multi-FA signal for Multiple antenna (MM) signals to the MMPAs 931, 933, 935 and 937.

When the MMBs 901 to 904, 911 to 914, and 921 to 924 in the TSB 910 transmit the Multi-FA signal for Multiple antenna (MM) signals, the MCB 970 delivers information indicating the multi-FA mode to the four MMPAs 931, 933, 935 and 937 using a mode control signal. Then each of the MMPAs 931, 933, 935 and 937 receiving the multi-FA mode control signal controls its SMPAs such that they operate in the multi-FA mode.

In the TSB 910, MMBs of respective sectors (e.g., α-sector MMBs 901, 902, 903 and 904, β-sector MMBs 911, 912, 913 and 914, and γ-sector MMBs 921, 922, 923 and 924), generate Multi-FA signal for Multiple antenna (MM) signals and transmit the generated Multi-FA signal for Multiple antenna (MM) signals to the SMPAs in each of the MMPAs 931, 933, 935, 937.

Then the SMPAs in each of the MMPAs 931, 933, 935 and 937, which are ready to operate in the multi-FA mode through the mode control signal from the MCB 970, receive the multi-FA signals generated by the MMBs 901 to 904, 911 to 914, and 921 to 924. That is, first SMPAs in the MMPAs 931, 933, 935 and 937 receive α-sector Multi-FA signal for Multiple antenna (MM) signals from the α-sector MMBs 901, 902, 903 and 904, second SMPAs in the MMPAs 931, 933, 935 and 937 receive β-sector Multi-FA signal for Multiple antenna (MM) signals from the β-sector MMBs 911, 912, 913 and 914, and third SMPAs in the MMPAs 931, 933, 935 and 937 receive γ-sector Multi-FA signal for Multiple antenna (MM) signals from the γ-sector MMBs 921, 922, 923 and 924.

Thereafter, the SMPAs each amplify the received Multi-FA signal for Multiple antenna (MM) signals in the multi-FA mode according to the mode control signal, and output the amplified Multi-FA signal for Multiple antenna (MM) signals to the FAB 950.

That is, the first SMPAs each amplify α-sector Multi-FA signal for Multiple antenna (MM) signals received from the MMBs 901, 902, 903 and 904 in the multi-FA mode according to the mode control signal, and then transmit the amplified signals to the FEBs 951, 953, 955 and 957. The second SMPAs each amplify β-sector Multi-FA signal for Multiple antenna (MM) signals received from the MMBs 911, 912, 913 and 914 in the multi-FA mode according to the mode control signal, and then transmit the amplified signals to the FEBs 971, 973, 975 and 977. The third SMPAs each amplify γ-sector Multi-FA signal for Multiple antenna (MM) signals received from the MMBs 921, 922, 923 and 924 in the multi-FA mode according to the mode control signal, and then transmit the amplified signals to the FEBs 991, 993, 995 and 997.

Then the FAB 950 transmits the amplified input signals via the FEBs 951 to 957, 971 to 977, and 991 to 997, and the antennas 952 to 958, 972 to 978, and 992 to 998.

As such, each SMPA in the four MMPAs, receiving the Multi-FA signal for Multiple antenna (MM) signals having the broad-bandwidth characteristic, operates in the multi-FA mode optimized for the broad-bandwidth signal. Each Multi-FA signal for Multiple antenna (MM) signal amplified by each of the MMPAs is transmitted via each FEB and the antenna. The system shown in FIG. 9 has a preferred configuration supporting four antennas, and the number of the MMPAs is adaptively changeable according to the number of antennas.

Figure 10:
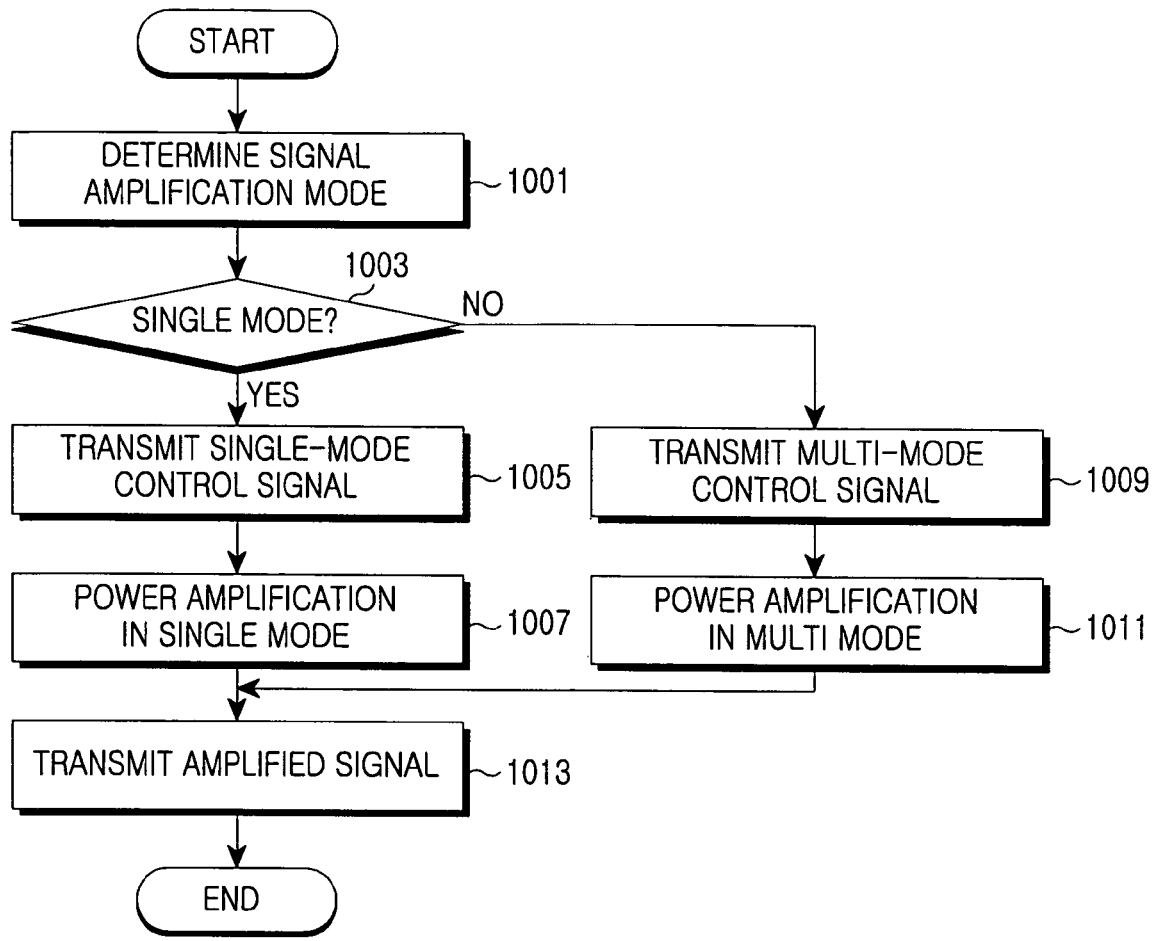
FIG. 10 is a flowchart illustrating a signal transmission procedure supporting multiple paths and multiple modes in a communication system according to the present invention.

FIG. 10 is a flowchart illustrating a signal transmission procedure supporting multiple paths and multiple modes in a communication system according to the present invention.

Referring to FIG. 10, if a specific signal is received, the MCB determines a mode of the received signal, in which the power amplifier should amplify the signal, in step 1001 and 1003. That is, the MCB determines a single-FA mode and a multi-FA mode according to the number of FAs of the received signal. If it is determined that the mode of the received signal corresponds to a single-FA mode having a narrow-bandwidth characteristic, the MCB transmits a mode control signal corresponding to the single-FA mode to an MMPA in step 1005. Then the MMPA amplifies the received signal in the single-FA mode according to the mode control signal in step 1007, and transmits the amplified signal in step 1013.

However, if it is determined that the mode of the received signal corresponds to a multi-FA mode having a broad-bandwidth characteristic, the MCB transmits a mode control signal corresponding to the multi-FA mode to the MMPA in step 1009. Then the MMPA amplifies the received signal in the multi-FA mode according to the mode control signal in step 1011, and transmits the amplified signal in step 1013.

As can be understood from the foregoing description, the provided transmission apparatus and method with MMPA in the communication system can optimize the system cost competitiveness and efficiency according to the number of FAs in operation, thereby maximizing the system competitiveness. With the use of the MMPA operating in the single-FA mode and the multi-FA mode, the MMPA is allowed to operate in the single-FA mode in a single-FA operation, thereby increasing efficiency and cost competitiveness of the system with a less number of FAs in operation. In addition, the MMPA is allowed to operate in the multi-FA mode in a multi-FA operation, thereby decreasing its required capacity and a capacity of the cooling system, with a large number of FAs in operation. Further, even for the communication system supporting a multi-antenna scheme like the Smart Antenna or MIMO scheme, the transmission apparatus and method of the present invention can increase the system competitiveness through the multi-pass/multi-mode support.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for transmitting a signal in a communication system, the apparatus comprising:
   a transmission signal generator for generating a transmission signal;
   a power amplifier for amplifying the transmission signal generated by the transmission signal generator according to a mode control signal;
   an output unit for outputting the signal amplified by the power amplifier; and
   a mode controller for generating the mode control signal according to a number of Frequency Assignments (FAs) of the transmission signal, and controlling a mode of the power amplifier according to the mode control signal.

2. The apparatus of claim 1, wherein the mode controller determines the mode control signal to be one of a single mode and a multi-mode according to the number of FAs, and generates the mode control signal corresponding to the one of the single mode and the multi-mode.

3. The apparatus of claim 1, wherein the power amplifier comprises at least one Multi-path/Multi-mode RF Power Amplifier (MMPA) that operates in one of a single mode and a multi-mode according to the number of FAs.

4. The apparatus of claim 3, wherein the MMPA comprises at least one Single-path/Multi-mode RF Power Amplifier (SMPA) supporting the single mode in which it operates as a Single-Carrier Power Amplifier (SCPA) or the multi-mode in which it operates as a Multi-Carrier Power Amplifier (MCPA), according to the number of FAs.

5. The apparatus of claim 1, wherein the transmission signal generator comprises at least one signal generator for generating a transmission signal according to the number of FAs.

6. The apparatus of claim 1, wherein the transmission signal generator comprises as many signal generators as the product of the number of Multi-path/Multi-mode RF Power Amplifiers (MMPAs) included in the power amplifier and a number of Single-path/Multi-mode RF Power Amplifiers (SMPAs) included in each MMPA.

7. The apparatus of claim 6, wherein each signal generator generates a transmission signal according to any one of a single mode, a multi-mode and an antenna geometry.

8. The apparatus of claim 1, wherein the power amplifier receives a mode control signal according to the number of FAs, and controls its Single-path/Multi-mode RF Power Amplifier (SMPA) so as to amplify a signal with a scheme optimized for the corresponding mode according to the mode control signal.

9. The apparatus of claim 1, wherein the power amplifier amplifies the signal according to a scheme of optimizing amplification of a narrow-bandwidth signal of the single mode, if the mode control signal indicates the single mode.

10. The apparatus of claim 1, wherein the power amplifier amplifies the signal according to a scheme of optimizing amplification of a broad-bandwidth signal of the multi-mode, if the mode control signal indicates the multi-mode.

11. The apparatus of claim 1, wherein the power amplifier comprises an Single-path/Multi-mode RF Power Amplifier (SMPA) being optimized for amplification of a narrow-bandwidth signal or a broad-bandwidth signal according to an FA mode of the communication system, constructs at least one Multi-path/Multi-mode RF Power Amplifier (MMPA) including a plurality of SMPAs, and operates according to at least any one system configuration among a single FA, a multi FA, and a smart antenna, using the MMPA.

12. The apparatus of claim 1, wherein the output unit comprises at least one channel combiner for combining different signals output from the power amplifier.

13. The apparatus of claim 1, wherein the output unit comprises a front end block and an antenna for transmitting the amplified signal received from the power amplifier over a channel.

14. A method for transmitting a signal in a communication system, the method comprising the steps of:
 generating, by a transmission signal generator, a transmission signal;
 determining a number of Frequency Assignments (FAs) of the transmission signal;
 determining a signal amplification mode of the transmission signal to be one of a single mode and a multi-mode, according to the number of FAs;
 generating a mode control signal corresponding to the one of the single mode and the multi-mode;
 amplifying the transmission signal according to the mode control signal; and
 outputting the amplified transmission signal.

15. The method of claim 14, wherein the transmission signal is amplified by at least one Multi-path/Multi-mode RF Power Amplifier (MMPA) that operates in one of the single mode and the multi-mode according to the number of FAs.

16. The method of claim 15, wherein the MMPA comprises at least one Single-path/Multi-mode RF Power Amplifier (SMPA) supporting the single mode in which it operates as a Single-Carrier Power Amplifier (SCPA) or the multi-mode in which it operates as a Multi-Carrier Power Amplifier (MCPA), according to the number of FAs.

17. The method of claim 14, wherein amplifying the transmission signal according to the mode control signal comprises:
 receiving the mode control signal, and
 controlling a Single-path/Multi-mode RF Power Amplifier (SMPA) to amplify the transmission signal with a scheme optimized for a corresponding signal amplification mode of the mode control signal.

18. The method of claim 14, wherein in the single mode the transmission signal is amplified according to a scheme for optimizing amplification of a narrow-bandwidth signal.

19. The method of claim 14, wherein in the multi-mode the transmission signal is amplified according to a scheme for optimizing amplification of a broad-bandwidth signal.

20. The method of claim 14, wherein the transmission signal is amplified by a Single-path/Multi-mode RF Power Amplifier (SMPA) being optimized for amplification of a narrow-bandwidth signal or a broad-bandwidth signal according to an FA mode of the communication system.

* * * * *